J. L. RILEY & M. S. BYRD.
AUTOMATIC POULTRY DISINFECTOR.
APPLICATION FILED FEB. 13, 1912.
1,075,855.
Patented Oct. 14, 1913.
2 SHEETS—SHEET 2.
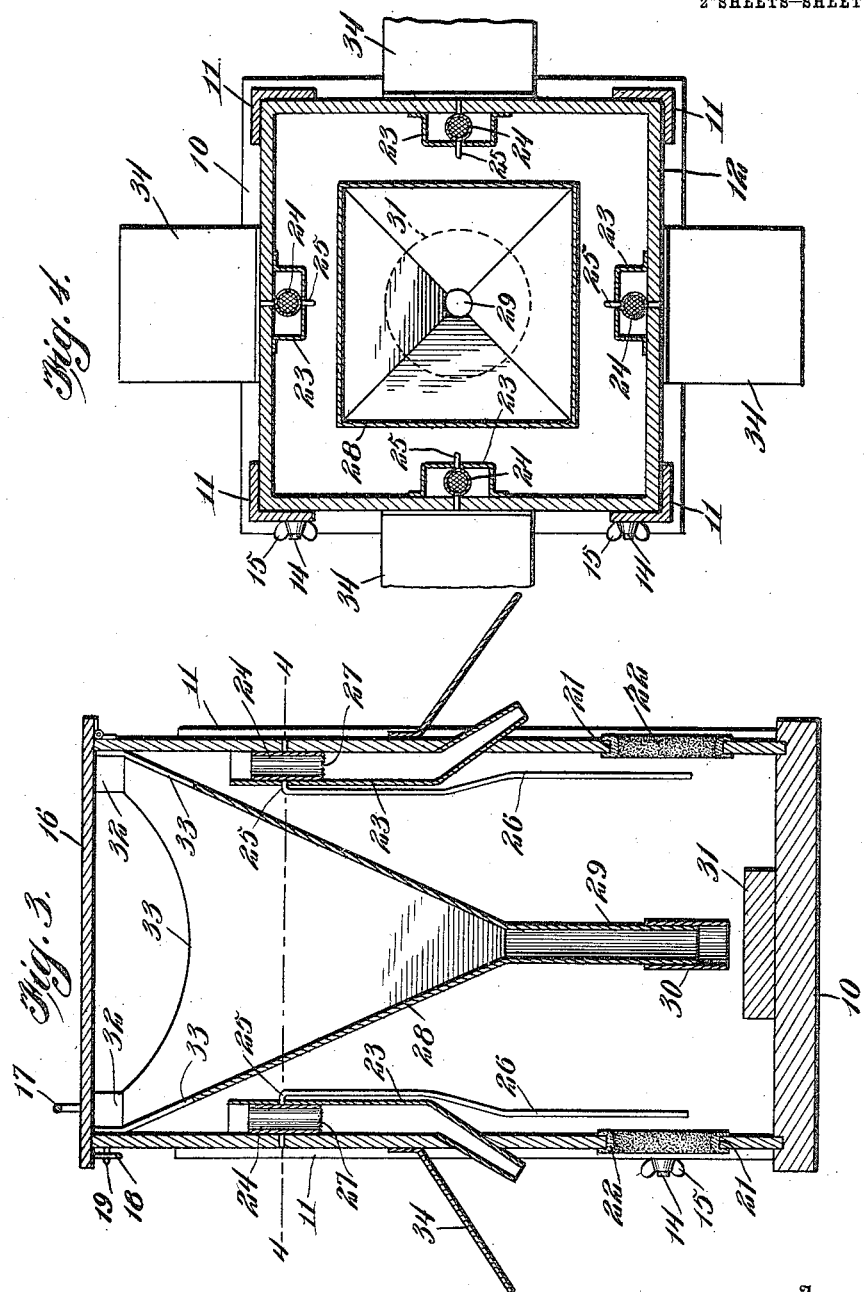

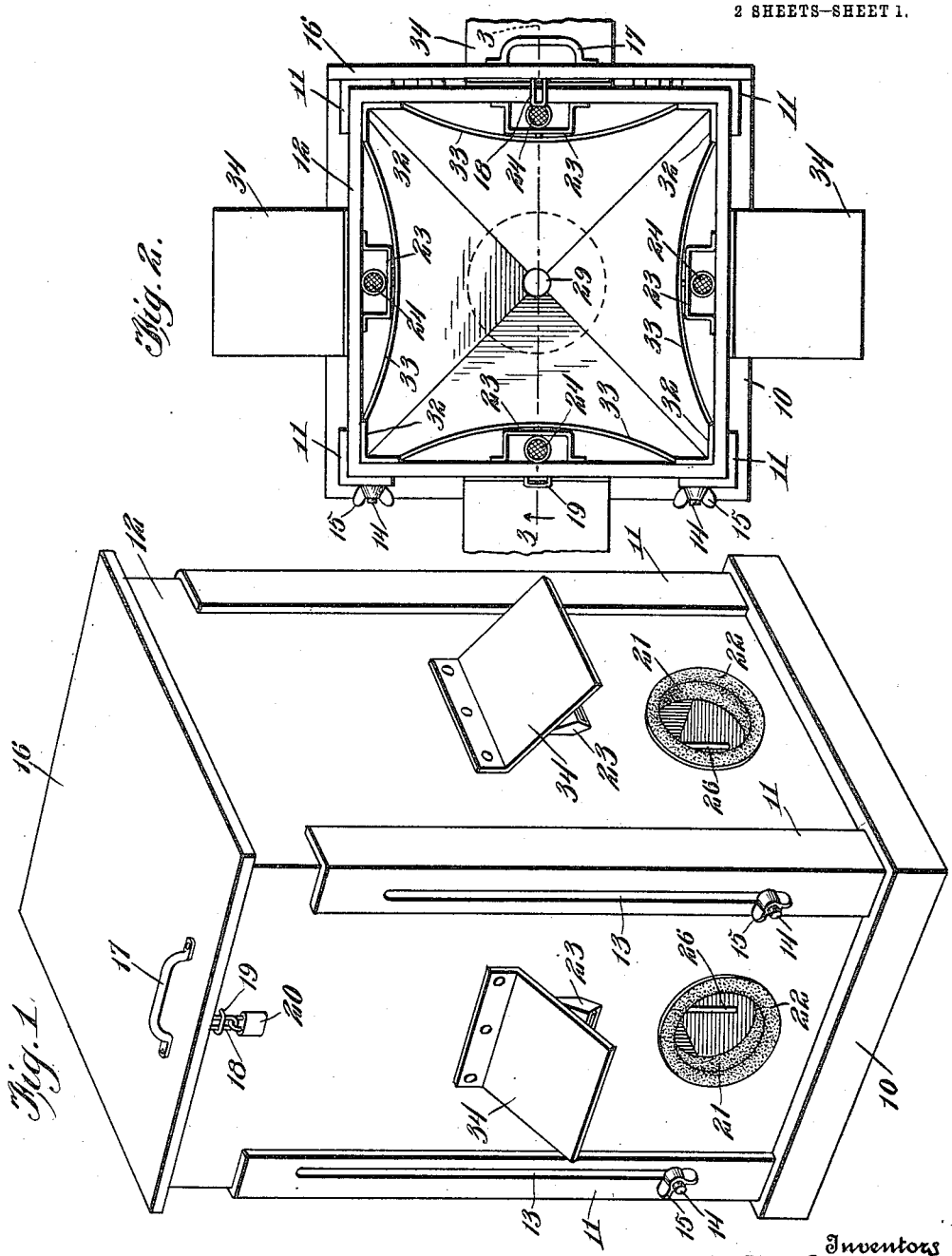

UNITED STATES PATENT OFFICE.

JAMES L. RILEY AND MERRITT S. BYRD, OF XENIA, ILLINOIS.

AUTOMATIC POULTRY-DISINFECTOR.

1,075,855. Specification of Letters Patent. Patented Oct. 14, 1913.

Application filed February 13, 1912. Serial No. 677,293.

*To all whom it may concern:*

Be it known that we, JAMES L. RILEY and MERRITT S. BYRD, citizens of the United States, residing at Xenia, in the county of Clay and State of Illinois, have invented new and useful Improvements in Automatic Poultry-Disinfectors, of which the following is a specification.

The invention embodies, among other features, an apparatus in which the feed is gravitationally fed to a feeding table, a new supply of food being supplied to the table as the food on the table is removed therefrom, the said device being provided with means operable by the poultry when the same remove food from the feeding table, for sprinkling a germicidal substance onto the backs of the poultry.

In the further disclosure of the invention, reference is to be had to the accompanying drawings constituting a part of this specification, in which similar characters of reference denote corresponding parts in all the views, and in which—

Figure 1 is a perspective view of the poultry feeding device. Fig. 2 is a plan view showing the cover in open position. Fig. 3 is a vertical sectional view taken on the line 3—3 in Fig. 2, the cover being shown in closed position. Fig. 4 is a horizontal sectional view taken on the line 4—4 in Fig. 3.

Referring more particularly to the views, use is made of a base 10 having standards 11 secured to the corners thereof, the said standards being preferably L-shaped in cross section to form guides for a casing 12 slidably mounted on the standards 11, a plurality of the said standards being provided with longitudinally extending slots 13 through which are slidably extended threaded bolts 14, secured to the casing 12, thumb nuts 15 being threadedly mounted on the bolts 14 and adapted to engage the standards 11 when tightened up on the bolts to secure the casing 12 rigid relatively to the standard 11 and base 10, the casing 12 being movable vertically relatively to the standards 11, when the thumb nuts 15 are partially unscrewed from the threaded ends of the bolts 14, thus permitting of adjusting the casing 12 to any desired height relatively to the base 10. A cover 16 is hingedly mounted on the casing 12 to close the upper end thereof, the said cover being provided with a handle 17 and a staple 18 movable into a staple 19 secured to a side of the casing 12, the said staple 19 being adapted to receive a lock or other fastening member 20 for locking the cover 16 to the casing 12.

Formed in the sides of the casing 12 are circular openings 21, sufficiently large to permit of poultry passing therethrough and into the casing 12, disinfectant means 22, comprising cloth saturated with kerosene or other germicidal oil, being secured to the walls of the openings 21 so that when the poultry pass through the openings the oil in the cloth, by the pressure exerted by the poultry against the cloth when passing through the opening germicide will be conveyed to the poultry for the purpose of exterminating any lice or germs that the poultry may be infected with.

Secured to the inner sides of the casing 12 are chutes 23 extending outwardly through the sides of the casing immediately above the openings 21 and mounted in the chutes 23 are containers 24, secured to lateral members 25 of depending actuating rods 26, said members 25 being journaled in the chutes 23 and said containers 24 being provided with perforated bottoms 27 constituting sieves, the lower ends of the actuating rods 26 being mounted to depend across the openings 21 adjacent the inner ends thereof. The containers 24 are filled with a germicidal powder and when a chicken passes through one of the openings 21, to enter the casing 12, the chicken will swing the actuating rod 26 to one side, thus swinging the container 24 to cause the germicidal powder to sift through the perforated bottom of the container and pass downwardly in the chute 23 from which the powder will sprinkle onto the back of the chicken and destroy any germs or vermin that the chicken may be infected with.

Mounted to depend within the casing 12 is a funnel-shaped hopper 28, terminating at the lower end in a tubular neck 29 having slidably mounted thereon a nozzle 30, arranged immediately above a feeding table 31, mounted on the base 10, within the casing 12. As shown in Fig. 2 the upper end of the hopper 28 is preferably of a square shape, the corners 32 of the hopper being secured to the corners of the casing 12 on the inner sides thereof with intermediate portions of the hopper cut away to provide spaces 33 above the chutes 23 so that by simply raising the cover 16, the disinfectant powder can be easily poured into the containers 24, mounted within the chutes 23.

In the use of the device described, the cover 16 is first swung into open position and the disinfectant powder is then poured into the containers 24 as mentioned, after which a supply of food is placed in the hopper 28. It will be readily seen that the food in the hopper will gravitationally flow onto the feeding table 31 and by adjusting the nozzle 30 relatively to the feeding table, the initial supply of food to the feeding table can be readily determined. The cover 16 is then closed and the device is ready for use. As the chicken passes through one of the openings 21 to obtain food from the feeding table, the head of the chicken brushing against the oil soaked cloth, constituting the disinfectant means 22, will receive a portion of the oil, said oil being provided to exterminate any vermin on the head of the chicken. As the head of the chicken passes through the opening 21 same will engage the lower end of the actuating rod 26 and move the same toward one side, thus operating the container 24 to cause the germicidal powder therein to be sifted through the container and thence pass downwardly through the lower end of the chute 23 and onto the back of the chicken to exterminate any vermin thereon. It is obvious that the chicken would not pass entirely into the casing 12, but would stand on the casing 12 with a portion of the body extending rearwardly through the opening 21 and as the chicken's head bobs back and forth in the search for food on the feeding table, the head will engage the actuating rod 26, thus imparting a slight swinging action to the rod so that a continuous supply of the germicidal powder will be sprayed upon the back of the chicken by the action of the head or body of the chicken in search and removing food from the feeding table 31. It will be readily understood that as the food is removed from the feeding table, a new supply will flow onto the feeding table from the hopper 28 so that the amount of food upon the feeding table will at all times be the same, the initial amount of food that flows onto the feeding table being controlled by the nozzle 30 slidable upon the neck 29 and adjustable relatively to the feeding table 31.

As mentioned heretofore the casing 12 can be vertically adjusted relatively to the base 10 and the standards 11 and for the purpose of preventing moisture from entering the casing, the edges of the cover 16 extend beyond the sides of the casing and suitable shields 34 are secured to the outer sides of the casing immediately over the outer ends of the chutes 23, thus retaining the food in the casing intact and also preventing rain from washing the germicidal powder from the back of the chicken as the powder is fed onto the chicken by the swinging action of the containers 24 operated by the chicken through the medium of the actuating rod 26.

We claim:—

1. In a device of the class described, the combination with a casing provided with a series of entrances, of chutes supported within said casing and to the opposed walls thereof and projecting outwardly therefrom, over the entrances thereto, and vertically disposed containers mounted to swing within each of said chutes, actuating rods having connection with said container for swinging the same and depending within said casing adjacent the said entrances.

2. In a device of the class described, the combination with a series of entrances, chutes supported within the casing and extending exteriorly thereof over the said entrances, vertically disposed containers movably mounted within the said chutes and adapted to contain a germicidal powder, sieves on the said containers for sifting the powder therefrom when the said containers are actuated, and vertically disposed actuating rods having connection with said containers and depending in rear of and adjacent the said entrances and disposed exteriorly of said chutes.

In testimony whereof we affix our signatures in presence of two witnesses.

JAMES L. RILEY.
MERRITT S. BYRD.

Witnesses:
   GEO. W. RILEY,
   LUCIEN E. FRYER.

---

Copies of this patent may be obtained for five cents each, by addressing the "Commissioner of Patents, Washington, D. C."